May 25, 1926.
J. W. COOPER ET AL
1,586,143
LAWN MOWER
Filed May 26, 1925
2 Sheets-Sheet 2
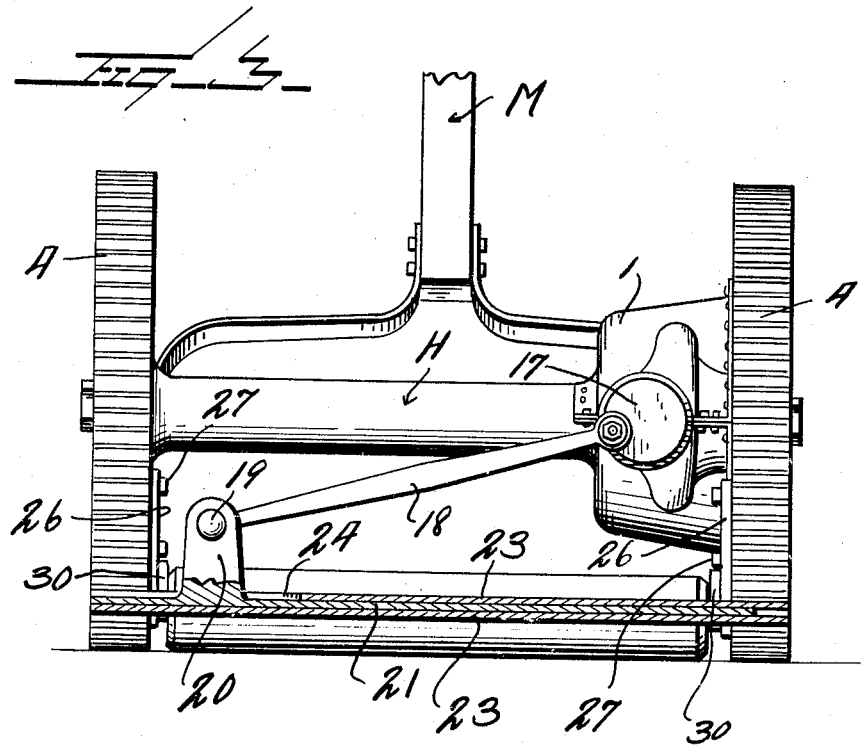
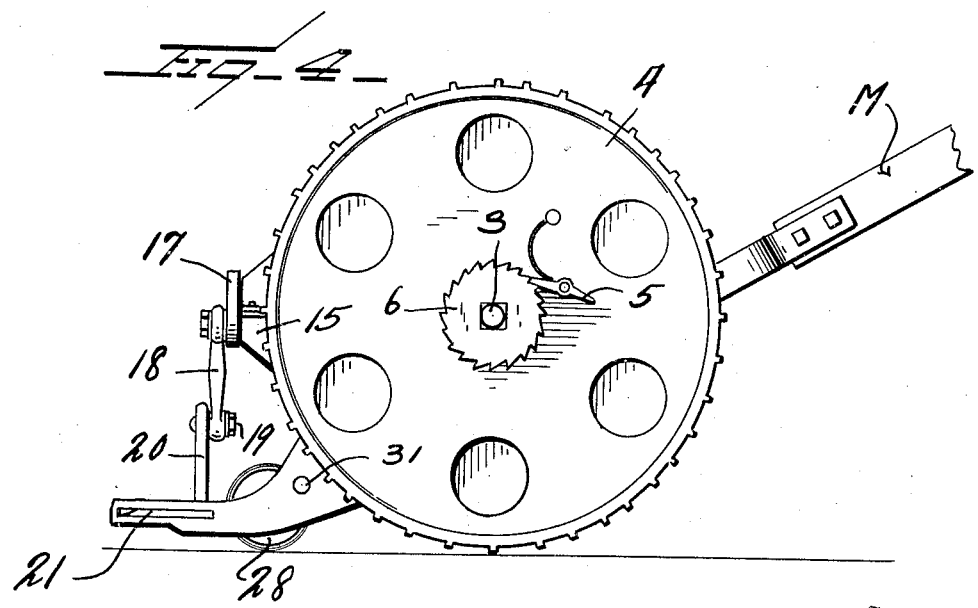
Inventors
J. W. Cooper
J. B. Morris
By Watson E. Coleman
Attorney Patented May 25, 1926.

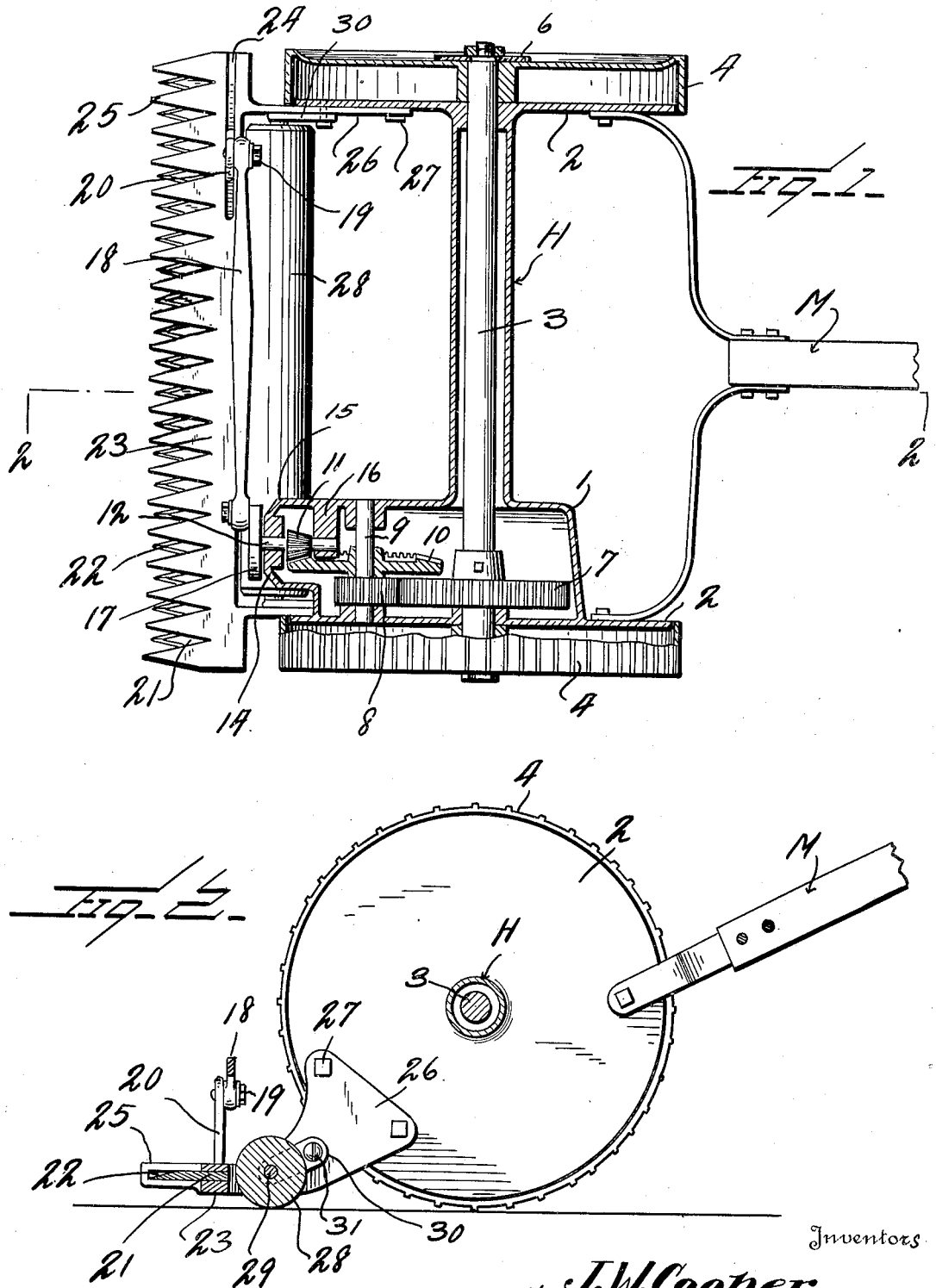

1,586,143

UNITED STATES PATENT OFFICE.

JAMES W. COOPER, OF BOCA RATON, FLORIDA, AND JAMES B. MORRIS, OF NASHVILLE, TENNESSEE.

LAWN MOWER.

Application filed May 26, 1925. Serial No. 32,967.

This invention relates to certain improvements in lawn mowers and it is an object of the invention to provide a device of this general character particularly adapted for use in cutting tall grass and to cut close to a fense or wall.

Another object of the invention is to provide a device of this kind employing a reciprocating sickle or cutter bar together with a stationary cutting member constituting a housing for the reciprocating cutter bar or sickle.

It is also an object of the invention to provide a device of this general character comprising a reciprocating cutter bar or sickle together with means for operating said bar or sickle during forward travel of the mower and wherein said reciprocating bar or sickle may be readily and conveniently removed when desired for sharpening.

An additional object of the invention is to provide a device of this general character embodying a reciprocating cutter bar or sickle together with means whereby said cutter bar or sickle and the parts directly associated therewith may be raised or lowered as the requirements of practice may prefer.

The invention consists in the details of construction and in the combination and arrangement of the several parts of our improved lawn mower whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a view partly in top plan and partly in horizontal section illustrating a mower constructed in accordance with an embodiment of our invention;

Figure 2 is a vertical sectional view taken substantially on the line 2—2 of Figure 1;

Figure 3 is a view partly in front elevation and partly in longitudinal vertical section of the device as illustrated in Figure 1;

Figure 4 is a view in side elevation of the device as herein disclosed;

Figure 5 is a view in end elevation of the roller and an adjusting arm therefor.

As disclosed in the accompanying drawings, H denotes a housing for the mower having one end portion enlarged, as at 1, the ends of the housing being provided with circular plates 2 of requisite diameter. Disposed through the housing H is the drive shaft 3 upon each extremity of which outwardly of and immediately adjacent to the plate 2 is mounted a drive wheel 4. Each of the wheels 4 is loosely mounted on the shaft 3 and carries a spring pressed pawl or dog 5 which normally engages a ratchet wheel 6 fixed to the shaft 3 so that normally both of the wheels 4 operate to drive the shaft 3. The provision of the pawl or dog 5 and the ratchet gear 6, however, operates to permit a relatively sharp or short turn of the mower to be made at the corners or the like whereby the efficiency of the machine is greatly increased.

Fixed to the shaft 3 and positioned within the enlarged portion 1 of the housing H is a gear 7 in mesh with a smaller gear 8 fixed to the shaft 9 interposed between and supported by the end walls of the enlarged portion 1 at a point in advance of the shaft 3. This shaft 9 has also fixed thereto a face gear 10 of a greater diameter than the gear 8, said face gear 10 meshing with a pinion 11 carried by a shaft 12. The shaft 12 is rotatably supported by the outer wall 14 of a forwardly extending part 15 of the enlarged portion 1 of the housing H and by an inwardly disposed lug 16 carried by the inside end wall of the enlarged portion 1. The shaft 12 extends forwardly of the part 15 and has fixed to its exterior extremity a disc 17 with which is eccentrically engaged an end portion of a pitman 18 disposed transversely of the machine. The opposite end portion of the pitman or shift rod 18 is operatively engaged, as at 19, with an upstanding arm 20 carried by an end portion of a reciprocating cutter bar or sickle 21. The bar or sickle 21 is of requisite length and has its front marginal portion provided with the forwardly extending cutting teeth 22 each substantially in the form of a V and said bar or sickle is snugly positioned within a tubular or hollow stationary cutter bar 23 the bore of which being open at each end. The upper wall of the bar 23 is provided in one end portion with a longitudinally disposed slot 24 open at its outer end and through which is directed the arm 20 hereinbefore referred to, said slot 24 being of a length to permit the requisite reciprocation of the bar or sickle 21 within the stationary bar 23 as the disc 17 is rotated.

By disconnecting the pitman or shift rod 18 from the arm 20 the cutter bar or sickle 21 may be readily withdrawn from within the stationary bar 23 when it is desired to sharpen said cutter bar or sickle 21 or to replace it.

The forward longitudinal marginal portion of the stationary bar 23 is provided therealong with suitable recesses to provide the spaced teeth 25, said teeth being also substantially V-shaped in form. The stroke of the cutter bar or sickle 21 is sufficient to cause the teeth 22 to have movement entirely across the space between adjacent teeth 25.

The opposite end portions of the stationary bar 23 are provided with the rearwardly directed plates 26 bolted, as at 27, or otherwise attached to the inner faces of the plates 2 of the housing H whereby the bar 23 is effectively supported in desired working position.

Positioned rearwardly of the bar 23 and substantially bridging the space between the plates 26 is a roller 28 freely mounted on a rod or shaft 29, the extremities of said shaft or rod 29 being operatively engaged with the arms 30. An end portion of each arm 30 is secured to an adjacent plate 26 by the screw 31 or the like. The opposed faces of said end portion of the arm 30, as indicated at 32 in Figure 5, and the plate 26 are provided with the radially arranged interlocking ribs or teeth whereby the arm 30 may be maintained in various vertical adjusted positions whereby the roller 28 may be raised or lowered to correspondingly raise and lower the bars 21 and 23 so that the cutting action upon the grass or the like may be as preferred.

Operatively engaged with the plates 2 in a well known manner is an operating push handle member M of any preferred type.

From the foregoing description it is thought to be obvious that a lawn mower constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

A lawn mower comprising, in combination, a housing, a shaft supported by the housing, ground engaging wheels mounted on the shaft, a hollow stationary bar supported by the housing in advance of the ground engaging wheels, the forward marginal portion of the bar being provided with a series of V-shaped recesses, a sickle bar slidable within the stationary bar, an arm carried by the sickle bar and extending exteriorly of the stationary bar through a slot therein, means for connecting the shaft with said arm for reciprocating the sickle upon rotation of the shaft, circular plates formed integral with the ends of the housing, a roller positioned between the circular plates and to the rear of said stationary bar, and means supported by the circular plates for adjusting the roller with respect to raising and lowering of the stationary bar and sickle bar slidable therein.

In testimony whereof we hereunto affix our signatures.

JAMES W. COOPER.
JAMES B. MORRIS.